United States Patent
Dumbrique et al.

(10) Patent No.: US 6,802,526 B2
(45) Date of Patent: Oct. 12, 2004

(54) INFLATABLE RESTRAINT MODULE

(75) Inventors: Conrad C. Dumbrique, Lake Orion, MI (US); Geoffrey A. Mills, Lake Orion, MI (US); Donald J. Paxton, Romeo, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/267,437

(22) Filed: Oct. 8, 2002

(65) Prior Publication Data

US 2004/0066021 A1 Apr. 8, 2004

(51) Int. Cl.$^7$ .............................................. B60R 21/16
(52) U.S. Cl. ................................. 280/728.2; 280/730.2
(58) Field of Search ........................... 280/728.2, 730.2, 280/731, 732, 736, 741

(56) References Cited

U.S. PATENT DOCUMENTS

| | | | | |
|---|---|---|---|---|
| 5,393,090 A | * | 2/1995 | Shepherd et al. | 280/728.2 |
| 5,460,400 A | * | 10/1995 | Davidson | 280/728.2 |
| 5,788,266 A | | 8/1998 | Rose et al. | 280/728.2 |
| 5,857,696 A | * | 1/1999 | Inoue et al. | 280/728.2 |
| 5,899,485 A | * | 5/1999 | Folsom et al. | 280/728.2 |
| 5,941,556 A | | 8/1999 | Rose | 280/728.2 |
| 6,341,797 B1 | * | 1/2002 | Seo | 280/730.2 |
| 6,364,351 B1 | * | 4/2002 | Hier et al. | 280/732 |
| 6,406,056 B2 | * | 6/2002 | Yokota | 280/728.2 |
| 6,543,802 B1 | * | 4/2003 | Uchiyama et al. | 280/728.2 |
| 6,543,803 B1 | * | 4/2003 | Harada et al. | 280/730.2 |
| 6,588,793 B2 | * | 7/2003 | Rose | 280/728.2 |
| 2002/0043787 A1 | * | 4/2002 | Yokoyama | 280/728.2 |

FOREIGN PATENT DOCUMENTS

| | | | | |
|---|---|---|---|---|
| DE | 19630819 | | 2/1998 | ........... B60R/21/20 |
| JP | 05193432 A | * | 8/1993 | ........... B60R/21/20 |

* cited by examiner

Primary Examiner—Paul N. Dickson
Assistant Examiner—Laura B. Rosenberg
(74) Attorney, Agent, or Firm—Sally J. Brown

(57) ABSTRACT

A lighter, low-cost inflatable restraint module is disclosed. The inflatable restraint module may include an inflator positioned within a heat shield. The heat shield and inflator may be disposed within an inflatable cushion. A portion of the cushion containing the inflator and heat shield is situated within a chamber. The chamber may include an opening in the chamber and an extension that projects away from the opening. Attachment of a portion of the inflatable cushion to the extension keeps the portion of the cushion away from the opening of the chamber and, thus, away from potentially damaging heat generated by the inflator. Alternatively, the portion of the cushion may be kept away from the opening by attachment to a cover which is, in turn, attached to the extension. The inflator, heat shield, chamber, and cushion may be secured within an interior region of a canister.

24 Claims, 6 Drawing Sheets

INFLATABLE RESTRAINT MODULE

BACKGROUND OF THE INVENTION

1. Field of the Invention

The present invention relates to inflatable restraints. More specifically, the present invention relates to an inflatable restraint module that is lighter and less expensive than conventional airbag modules.

2. Technical Background

The inclusion of inflatable safety restraints, or airbags, is now a legal requirement for many new vehicles. In addition to this, inflatable airbags enjoy widespread acceptance for use in motor vehicles and are credited with preventing numerous deaths and injuries. Some studies estimate that the use of frontally placed airbags reduces the number of fatalities in head-on collisions by 25% among drivers using seat belts and by more than 30% among unbelted drivers. Other research suggests that in a frontal collision, the combination of a seat belt and an airbag can reduce serious chest injuries by 65% and serious head injuries by up to 75%. These numbers, and the thousands of prevented injuries they represent, demonstrate the life-saving potential of airbags and the need to encourage their use, production, and development.

As a result, in part, of benefits such as those described above, automakers are now required to install airbags in most new vehicles sold in the United States. Furthermore, many automobile manufacturers have turned airbag technology into a marketing tool. Enticed by the promise of added safety, many vehicle purchasers seek out vehicles with sophisticated airbag systems.

Airbags are often installed in the steering wheel and in the dashboard on the passenger side of a vehicle. In the event of an accident, an accelerometer situated within the vehicle measures the abnormal deceleration caused by the accident and triggers the expulsion of expanding gases from an inflator into each of the airbags. The expanding gases rapidly fill the airbags, which immediately inflate in front of the driver and passenger to protect them from impacts against the windshield, dashboard, or steering wheel.

As a result of the success of front-installed airbags, other airbags designed to protect occupants in various types of vehicular collisions have been developed. For instance, side impact airbags, often in the form of inflatable curtains, were developed in response to the need for protection from impacts in a lateral direction, or against the side of the vehicle. Such curtains are placed along the side of a vehicle in places such as the ceiling or roof rails. An inflatable curtain may be composed of one or more separately inflated cushions that protect individual passengers in different positions within the vehicle.

Automobile manufacturers may install airbags in their vehicles by securing an airbag module to an appropriate location within the vehicle and connecting an inflator within the module to an accelerometer of the vehicle. The airbag module may include structures for securing the module within the vehicle and an interface for connecting the inflator to the accelerometer.

One type of conventional airbag module may include an inflatable cushion. The inflatable cushion may have two openings for receiving the inflator. However, the inflator cannot be placed immediately adjacent to the inflatable cushion. If so, heat generated during activation of the inflator could damage the cushion and prevent proper deployment.

To avoid damage to the cushion, a diffuser is often interposed between the inflator and the cushion. The diffuser surrounds the inflator and separates the inflator from the cushion. The diffuser is often made from metal. Consequently, the diffuser is quite heavy. Also, the diffuser typically includes a number of openings to allow gas from the inflator to move from the inflator into the cushion. As such, the diffuser is intricate and is made by a relatively complex manufacturing process. This process can become quite expensive, particularly when a large number of airbag modules are manufactured. The diffuser may also include protrusions for securing and orienting the diffuser within a canister, again increasing the complexity of the airbag module.

The canister protects the inflatable cushion and inflator and may be used to secure the airbag module to the vehicle. Although various configurations exist, the protrusions generally pass through apertures in the inflatable cushion and interlock with the canister. Unfortunately, the apertures increase the cost and complexity of manufacturing the cushions.

The canister must also include openings, mechanisms, and/or structures for interlocking with the protrusions of the diffuser. These interlocking mechanisms are often complex and intricate. The manufacturing process must be precise to ensure a smooth interaction between the protrusions and the locking mechanisms. Thus, the manufacturing costs are high.

In view of the foregoing, it would be an advancement in the art to provide an airbag module having lighter and less intricate components. It would be a further advancement in the art to provide an airbag module that is less expensive to manufacture than conventional airbag modules.

SUMMARY OF THE INVENTION

The apparatus and methods of the present invention have been developed in response to the present state-of-the-art, and, in particular, in response to problems and needs in the art that have not yet been fully resolved by currently available airbag modules. To achieve the foregoing, and in accordance with the invention as embodied and broadly described in the preferred embodiments, an inflatable restraint module that is lighter and less expensive to manufacture than conventional airbag modules is disclosed.

The inflatable restraint module may include an inflator that generates gas or foam to inflate an inflatable cushion. The gas or foam may exit the inflator through one or more gas exit ports. The inflator may be generally cylindrical in shape and have a first and a second end. The first end of the inflator may include inclined threads. A mating nut may be attached to the incline threads. The second end of the inflator includes an expanded portion.

The inflatable restraint module may also include a heat shield disposed around the inflator. The heat shield is shaped to surround the inflator. For instance, if an inflator is cylindrical in shape, the heat shield may be a rectangular piece of fabric that can be positioned around the inflator. The heat shield may be made from various materials, including a heat-resistant fabric.

The heat shield does not necessarily encompass the entire inflator. Instead, the heat shield, when disposed around the inflator, may define a gap. The exit gas ports of the inflator may be aligned with the gap in the heat shield.

The inflatable restraint module may include an inflatable cushion disposed around the heat shield and inflator. More specifically, the cushion may include a loop defining two orifices. The orifices may be shaped to receive an inflator such that the cushion surrounds the inflator. The cushion may also include an expandable portion that expands when a foam or gas from the inflator is rapidly injected into the inflatable cushion.

The inflatable restraint module may also include a chamber positioned around the inflator, heat shield, and loop of the cushion. The chamber may be generally cylindrical and may be shaped to receive the inflator, heat shield, and loop. More specifically, the chamber may include an interior compartment having two open ends. Thus, the loop of the cushion having the inflator and heat shield disposed therein is positioned within the interior compartment. The chamber is shorter than the inflator such that the first and second ends of the inflator may protrude out of each of the open ends of the chamber when an inflator is positioned in the chamber.

The open ends of the interior compartment should be sufficiently large, such that the inflator, heat shield, or both may be inserted through one of the open ends into the interior compartment. Of course, the open ends may be partially enclosed and still permit an inflator to be inserted into the interior compartment.

An opening may be formed in the chamber. The loop of the cushion extends from the interior compartment through the opening of the chamber. The expandable portion of the cushion is positioned in a folded state on a lip of the chamber. Accordingly, the opening may be configured in various shapes to achieve this purpose. The gap of the heat shield may be aligned with the opening in the chamber so that gas may rapidly exit the inflator through the gap of the heat shield into the inflatable portion of the cushion.

The chamber may also include an outward extension. The extension may be positioned proximate the opening and projects away from the opening. The extension is coupled to the cushion. In this embodiment, the extension may be coupled to the cushion by attachment to the cushion. More specifically, a portion of the cushion is attached to the extension of the chamber. The portion of the cushion may be sewn to the extension. Alternatively, the portion may be attached to the extension using adhesives, rivets, a nut and bolt, or the like. Being attached to the extension, the portion of the cushion is kept away from the opening in the chamber and, as a consequence, is kept away from the inflator. If the portion of the cushion were not kept away from the inflator, the cushion could be damaged by heat generated by the inflator during inflation. Thus, the extension is shaped to keep a portion of the cushion away from the opening. The extension may be configured in various ways to achieve this purpose.

The chamber is simple in design and may be made from various materials, including plastic or metal. When made from plastic, the chamber is very light and inexpensive to manufacture.

The inflatable restraint module may also include a canister at least partially disposed around the inflator, heat shield, cushion and chamber. More specifically, the canister may include an interior region in which the inflator, heat shield, cushion and chamber may be positioned. The canister may also define an open side through which the cushion and chamber may be inserted into the interior region. The cushion may deploy through the open side of the canister.

The canister also includes a first and a second mouth. The first and second mouths may be formed in opposing ends of the canister. The first and second mouths may be shaped and positioned so that the first end of the inflator is disposed within the second mouth of the canister, and a second end of the inflator is disposed within the first mouth of the canister. The first mouth is shaped to receive the inflator so that the inflator may be inserted into the canister through the first mouth.

A mating nut is attached to the inclined threads on the first end of the inflator. The mating nut is wider than the second mouth of the canister. As stated above, the second end of the inflator includes the expanded portion that is wider than the first mouth of the canister. Thus, the canister is positioned between the expanded portion of the inflator and the nut, which is attached to the inflator. The nut is tightened down on the inclined threads so that the nut and expanded portion are pulled towards each other to secure the inflator within the canister. When secured in the canister and positioned in through the loop of the cushion, the inflator aids in securing the cushion to the canister, such that the cushion is tethered to the inflatable restraint module at the time of inflation.

Like the first embodiment, a second embodiment of the inflatable restraint module includes a cushion, inflator, and heat shield. As will be explained below, the second embodiment also includes a chamber and a canister which may be slightly different than those of the first embodiment. The second embodiment also includes a cover that is not used in the first embodiment of the inflatable restraint module.

In the second embodiment, just as in the first embodiment, a heat shield is positioned around the inflator. The heat shield and inflator are positioned within a loop of the cushion. The loop of the cushion is situated within an interior compartment of a chamber. The cushion extends out of the interior compartment through an opening in the chamber. An expandable portion of the cushion may be folded and placed on a lip of the chamber.

As in the first embodiment, an outward extension of the chamber is coupled to the cushion. More specifically, a portion of the cushion is attached to the outward extension of the chamber. The outward extension may be situated proximate the opening and projects away from the opening. Attachment of the portion of the cushion to the extension keeps the portion of the cushion away from the opening of the chamber and the inflator to prevent damage to the cushion at the time of inflation.

In the second embodiment, the inflator, cushion, and chamber are also positioned within an interior region of a canister. The inflator, cushion, and chamber may be inserted into the interior region of the canister through an open side of the canister.

Like the first embodiment, the second embodiment also includes a canister having a first and second mouth. A first end of the inflator may be positioned within the second mouth of the canister, and a second end of the inflator may be situated within the first mouth of the canister. The second end of the inflator includes an expanded portion that is wider than the first mouth of the canister. As with the first embodiment, a mating nut, which is wider than the second mouth, may be attached to inclined threads on the first end of the inflator to secure the inflator within the canister.

Unlike the first embodiment, the second embodiment includes a cover that extends from the extension of the chamber, across the open side of the canister, and is attached to the canister. The cover is shaped to cover the cushion and thus to prevent damage to the cushion. The cover may be integrally formed with the extension of the chamber or may be attached to the chamber. For instance, the cover may be sewn to the extension. Alternatively, adhesives, rivets, or a nut and bolt may be used to attach the cover to the extension.

The cover is also attached to the canister. Again, various techniques may be used to do so. For instance, the cover may include a set of tabs that interlock with mating apertures in the canister.

At the time of inflation, the cushion deploys through the cover. Thus, the material from which the cover is made may, for instance, include frangible seams so that the cover does not impede deployment of the inflatable cushion.

Like the first embodiment, a third embodiment includes an inflator, heat shield, cushion, and canister. As will be explained below, the third embodiment includes a chamber which is slightly different from the chamber of the first embodiment and further includes a cover that is different than the cover of the second embodiment.

In the third embodiment, just as in the first embodiment, a heat shield is positioned around the inflator. The heat shield and inflator are positioned within a loop of the cushion. The loop of the cushion is situated within an interior compartment of the chamber. The cushion extends out of the interior compartment through an opening in the chamber. An expandable portion of the cushion may be folded and placed on a lip of the chamber. In the third embodiment, the inflator, cushion, and chamber are also positioned within an interior region of the canister. The inflator, cushion, and chamber may be inserted into the interior region of the canister through an open side of the canister.

Like the first embodiment, the third embodiment also includes a canister having a first and second mouth. The inflator is positioned in the canister such that a first end of the inflator is positioned within the second mouth of the canister, and a second end of the inflator is situated within the first mouth of the canister. The second end of the inflator includes an expanded portion that is wider than the first mouth of the canister. As with the first and second embodiments, a mating nut, which is wider than the second mouth, may be attached to inclined threads on the first end of the inflator to secure the inflator within the canister.

The cushion is coupled to the outward extension of the chamber. However, unlike the first embodiment, the cushion is coupled to the outward extension by attachment to a cover, which is attached to the outward extension. More specifically, a portion of the cushion is attached to a cover and the cover is attached to the outward extension of the chamber to keep the portion of the cushion away from the opening of the chamber and the inflator to prevent damage to the portion of the cushion at the time of inflation. The cover may be attached to the cushion using various techniques. For instance, the cover may be sewn to the cushion.

The cover may be attached to the extension using various techniques. For example, a first set of apertures in the cover may mate with a set of tabs on the extension of the chamber. The cover of the third embodiment then wraps around, or surrounds, the chamber and the expandable portion of the cushion. As explained above, the inflator, heat shield, and loop of the cushion are disposed within the chamber.

After being wrapped around the chamber and expandable portion of the cushion, the cover attaches once again to the extension. For instance, tabs on the extension may mate with a second set of apertures in the cover. Of course, various techniques may be used to attach the cover to the extension. For instance, the cover may be sewn to the extension. Alternatively, rivets, a nut and a bolt, or adhesives may be used to attach the cover to the extension. The cover may be sewn to the inflatable cushion. The cover may be made from various materials, including fabrics and plastics, as will be understood by those skilled in the art.

In view of the foregoing, the inflatable restraint module provides substantial advantages over conventional airbag modules. The individual components of the inflatable restraint module are simple in design and, as a consequence, are less expensive to manufacture than conventional module components. Many of the components may be made from plastic or fabric rather than metal, further diminishing the cost and weight of the module.

These and other advantages of the present invention will become more fully apparent from the following description and appended claims, or maybe learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–6. The members of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
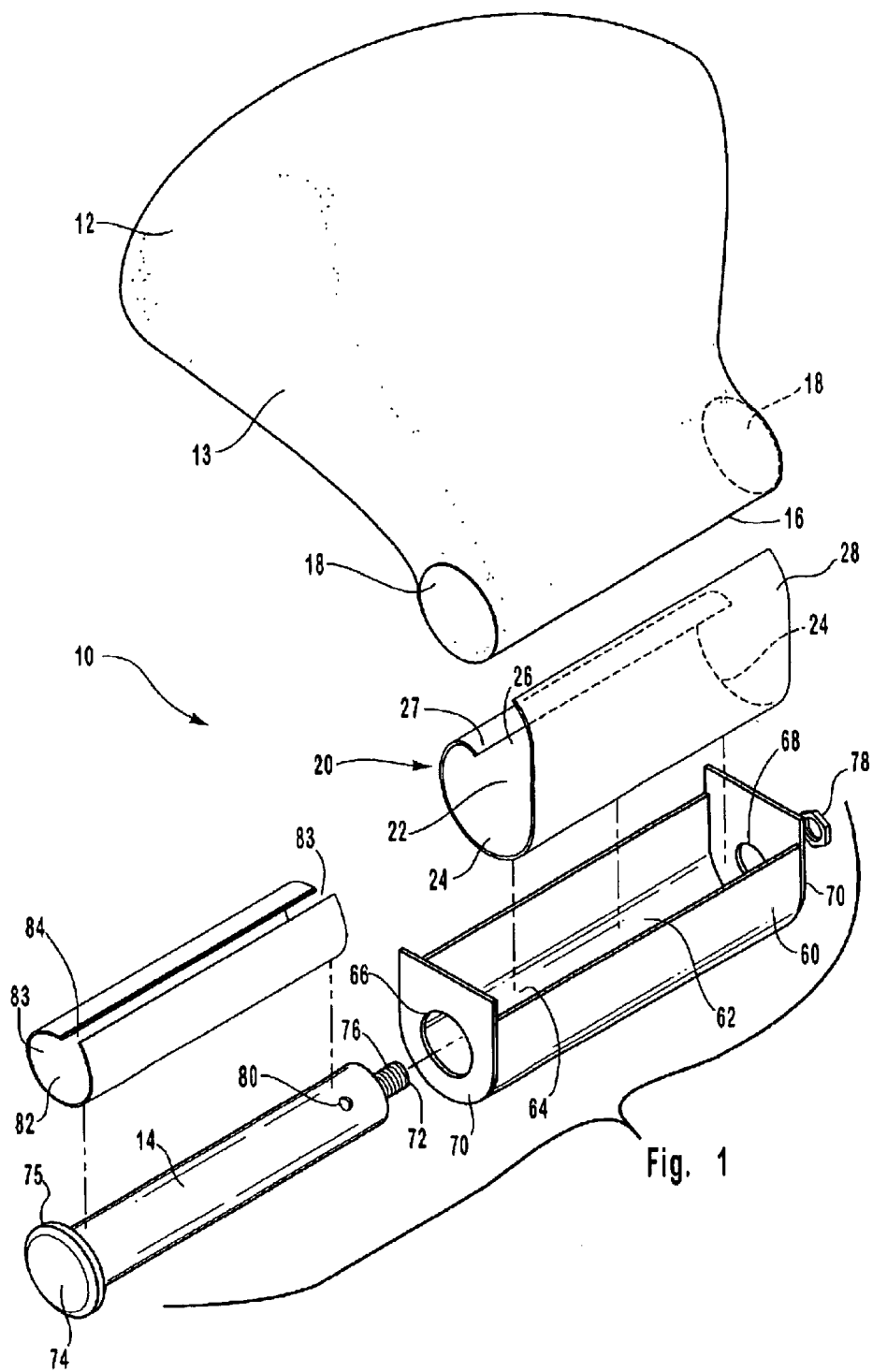
FIG. 1 is an exploded perspective view of an inflatable cushion, chamber, heat shield, inflator, and canister of a first embodiment of the inflatable restraint module.
Figure 2:
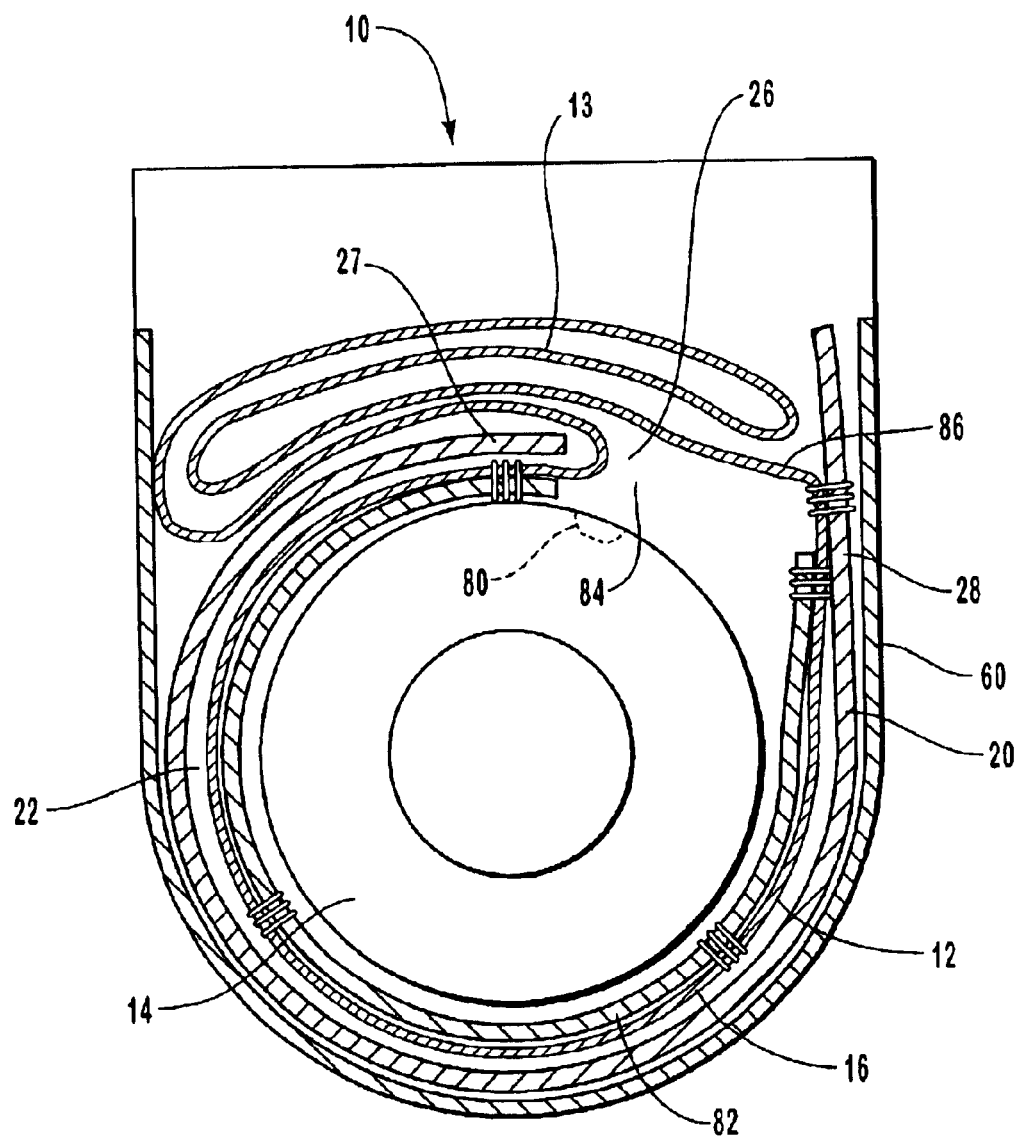
FIG. 2 is a cross-sectional view of the first embodiment of the inflatable restraint module.

Referring to FIG. 1, there is shown a perspective view of a first embodiment of the inflatable restraint module 10. The inflatable restraint module 10 may include an inflatable cushion 12. The inflatable cushion 12 includes an expandable portion 13 that expands when a gas or foam is rapidly injected into the inflatable cushion 12. The expandable portion 13 is shown in an inflated state in FIG. 1. However, the expandable portion 13 may be placed in a folded state prior to inflation, as illustrated in FIG. 2.

The inflatable cushion 12 may be shaped to receive an inflator 14 that produces gas or foam to inflate the cushion 12. More specifically, the cushion 12 may include a loop 16. The loop 16 defines two orifices 18 within the cushion 12. The orifices 18 may be shaped to receive an inflator 14 such that the cushion 12 surrounds the inflator 14. The orifices 18 may be slightly smaller or approximately the same size as the inflator 14 so that the inflator 14 may be snugly positioned within the two orifices 18.

The inflatable restraint module 10 may also include a chamber 20. The illustrated chamber 20 is generally cylindrical in shape. However, the chamber 20 may be configured in other shapes. For example, the chamber 20 may have a rectangular or square cross-sectional shape. The chamber 20 is simple in design and, thus, is easy and inexpensive to manufacture. The chamber 20 may be formed from various materials including plastics. When the chamber 20 is made from plastic, it is not only inexpensive to manufacture, but is lightweight.

The chamber 20 is hollow and defines an interior compartment 22 having open ends 24. The interior compartment 22 is designed to receive the inflator 14 and, as a consequence, may be similar in shape to the inflator 14. The interior compartment 22 is slightly shorter in length than the inflator 14. As such, the inflator 14 may protrude slightly out of the chamber 20 when the inflator 14 is positioned therein.

The open ends 24 of the chamber 20 may be slightly wider than or about the same size as the inflator 14 to allow the inflator 14 to be inserted into the interior compartment 22. The open ends 24 may be partially enclosed and still permit an inflator 14 to be inserted into the interior compartment 22.

The chamber 20 may also include an opening 26. As illustrated, the opening 26 extends along the length of the chamber 20. The opening 26 is shaped to receive the loop 16 of the cushion 12. In particular, the loop 16 may be inserted through the opening 26 into the interior compartment 22. The opening 26 may be embodied in various shapes and positioned at various locations on the chamber 20 to permit the loop 16 to be inserted into the interior compartment 22.

When the loop 16 is positioned within the interior compartment 22, the cushion 12 may be oriented such that each orifice 18 is positioned within one of the open ends 24 of the compartment 22. When the cushion 12 is so oriented, an inflator 14 may be inserted into the cushion 12 through the orifices 18. Also, the expandable portion 13 of the cushion 12 may be folded and placed on a lip 27 of the chamber 20.

The chamber 20 may also have an outward extension 28. The outward extension 28 may be located on the chamber 20 adjacent to the opening 26. The outward extension 28 projects away from the opening 26. The function of the outward extension 28 will be discussed in connection with FIG. 2.

The inflatable restraint module 10 may also include a canister 60. The canister 60 is hollow and may have an open side 62. The open side 62 may be shaped to receive the chamber 20 and inflatable cushion 12 so that the chamber 20 and cushion 12 may be positioned within an interior region 64 of the canister 60. In particular, the interior region 64 of the canister 60 is shaped to receive the chamber 20 when the loop 16 of the cushion 12 is positioned within the interior compartment 22 of the chamber 20. The canister 60 may be used to attach the inflatable restraint module 10 to a vehicle (not shown).

The canister 60 may include a first and a second mouth 66, 68. The mouths 66, 68 may be positioned on opposing ends 70 of the canister 60, as illustrated in FIG. 1. The first and second mouths 66, 68 are dimensioned to receive the inflator 14. In particular, a first end 72 of the inflator 14 may be inserted through the first mouth 66 of the canister 60 and through the interior region 64 of the canister 60. The first end 72 of the inflator 14 may then be inserted into the second mouth 68 of the canister 60 at the same time that a second end 74 of the inflator 14 moves into the first mouth 66 of the canister 60. As a consequence, the first mouth 66 of the canister 60 is shaped to be positioned around the second end 74 of the inflator 14, and the second mouth 68 of the canister 60 is shaped to be positioned around the first end 72 of the inflator 14.

The second end 74 of the inflator 14 includes an expanded portion 75 that is wider than the first mouth 66 of the canister 60. The first end 72 of the inflator 14 may also include inclined threads 76 for receiving a mating nut 78. The mating nut 78 is wider than the second mouth 68 of the canister 60. When the inflator 14 is positioned within the canister 60, the mating nut 78 may be attached to the inclined threads 76 on the first end 72 of the inflator 14. As the nut 78 is tightened down on the inclined threads 76, the nut 78 and expanded portion 75 of the inflator 14 are pulled towards each other to secure the inflator 14 within the canister 60. Other mechanisms besides inclined threads 76 and a mating nut 78 may be used to secure the inflator 14 within the canister 60. For example, it is possible to employ a hole (not shown) in the first end 72 of the inflator 14 and an interlocking pin (not shown) to lock the inflator 14 within the canister 60.

As stated above, the inflator 14 generates gas or foam for inflating the inflatable cushion 12. The inflator 14 may use various techniques to do so. For instance, compressed gas may be released to inflate the cushion 12. Alternatively, a pyrotechnic may generate gas to inflate the cushion 12. Also, a combination of both pyrotechnics and compressed gas may be used to inflate the cushion 12. The gas or foam may exit the inflator 14 via a gas exit port 80.

The inflatable restraint module 10 may also include a heat shield 82. The heat shield 82 is shaped to receive and surround the inflator 14. The heat shield 82 may have open ends 83. The shape of the heat shield 82 may be adapted to surround an inflator 14 of a particular size and shape in use in the inflatable restraint module 10. For instance, when the inflator 14 is cylindrical in shape, the heat shield 82 may be a rectangular piece of fabric that can be folded to surround the inflator 14. The heat shield 82 is designed to protect the inflatable cushion 12 from heat generated by the inflator 14 when an inflator 14 positioned within the cushion 12 is activated, as will be illustrated below. In addition, the heat shield 82 may be slightly shorter than a circumference of the inflator 14 so that, when the heat shield 82 is positioned around the inflator 14, the heat shield 82 defines a gap 84 that provides a convenient exit route for gas exiting the inflator 14, as illustrated in FIG. 2. The heat shield 82 may be made from various materials that resist conducting heat, including certain fabrics, which are known to those skilled in the art.

Those skilled in the art will recognize that the inflatable restraint module 10 may be adapted to deploy from various locations within a vehicle (not shown). For instance, the module 10 may be embodied as a driver-side, passenger-side, side-impact, and knee bolster inflatable restrain module 10. Also, the expandable portion 13 of the cushion 12 may be shaped to provide appropriate protection to a passenger of a vehicle from each of these deployment locations.

FIG. 2 is a cross-sectional view of the assembled first embodiment of the inflatable restraint module 10. The inflator 14 is shown in a side view rather than a cross-sectional view. As illustrated, the inflator 14 is positioned within the heat shield 82. As explained above, the heat shield 82 may define a gap 84 that provides a convenient exit route for gas leaving the inflator 14. The gap 84 may be aligned with the opening 26 in the chamber 20 so that gas may rapidly exit the inflator 14 through the gap 84 and the opening 26 into the cushion 12. The exit gas port or ports 80 of the inflator 14 may also be aligned with the gap 84 in the heat shield 82.

The inflator 14 and heat shield 82 are positioned within the loop 16 of the cushion 12. More specifically, as illustrated in FIG. 2, the heat shield 82 may be sewn into, or otherwise secured within, the loop 16 of the cushion 12. The heat shield 82 may also be integrally formed with the cushion 12. The expandable portion 13 of the cushion 12 is placed in a folded state outside of the chamber 20. More specifically, the expanded portion 13 is folded and placed on a lip 27 of the chamber 20.

As illustrated, the outward extension 28 is coupled to the cushion 12. In this embodiment, the outward extension 28 is coupled to the cushion 12 by attachment to the cushion 12. More specifically, a portion 86 of the cushion 12 is attached to the outward extension 28 of the chamber 20. The portion 86 of the cushion 12 may be sewn to the outward extension 28, as illustrated in FIG. 2. Alternatively, the portion 86 of the cushion 12 may be attached to the extension 28 using adhesives, rivets, a nut and bolt, or the like. As such, the portion 86 of the cushion 12 is kept away from the opening 26 in the chamber 20 and is simultaneously kept away from the inflator 14. If the portion 86 of the cushion 12 were not kept away from the inflator 14, the cushion 12 could be damaged by heat generated by the inflator 14 during inflation.

The assembled inflator 14, heat shield 82, chamber 20, and cushion 12 may be positioned within the canister 60. As stated, the assembled inflator 14 and heat shield 82 may be inserted through the open side 62 of the canister 60 into the interior region 64 of the canister 60. Thereafter, the inflator 14 is inserted into the canister 60 through the first mouth 66 such that the inflator 14 may be positioned within the interior compartment 22 of the chamber 20 and the loop 16 of the cushion 12.

The heat shield 82 could be wrapped around the inflator 14 before the inflator 14 is inserted through the first mouth 66 of the canister 60, or could simply be inserted into the first mouth 66 of the canister 60 before the inflator 14 is inserted therein. Alternatively, the heat shield 82 could be positioned within the loop 16 of the cushion 12 before the cushion 12 and chamber 20 are inserted into the canister 60 through the open side 62 of the canister 60.

The inflatable restraint module 10 may operate in the following manner. A signal indicating that accident conditions exist is received by the inflator 14. In response to the received signal, inflator gas is generated by the inflator 14. The inflator gas exits the inflator 14 through the gas exit port 80. The inflator gas moves through the gap 84 in the heat shield 82 and through the opening 26 in the chamber 20 into the expandable portion 13 of the cushion 12 to inflate the cushion 12. The cushion 12 is tethered to the module 10 by the loop 16 which is positioned around the inflator 14. Attachment of the portion 86 of the cushion 12 to the outward extension 28 keeps the portion 86 away from heat generated by the inflator 14 to prevent damage to the cushion 12.

Figure 3:
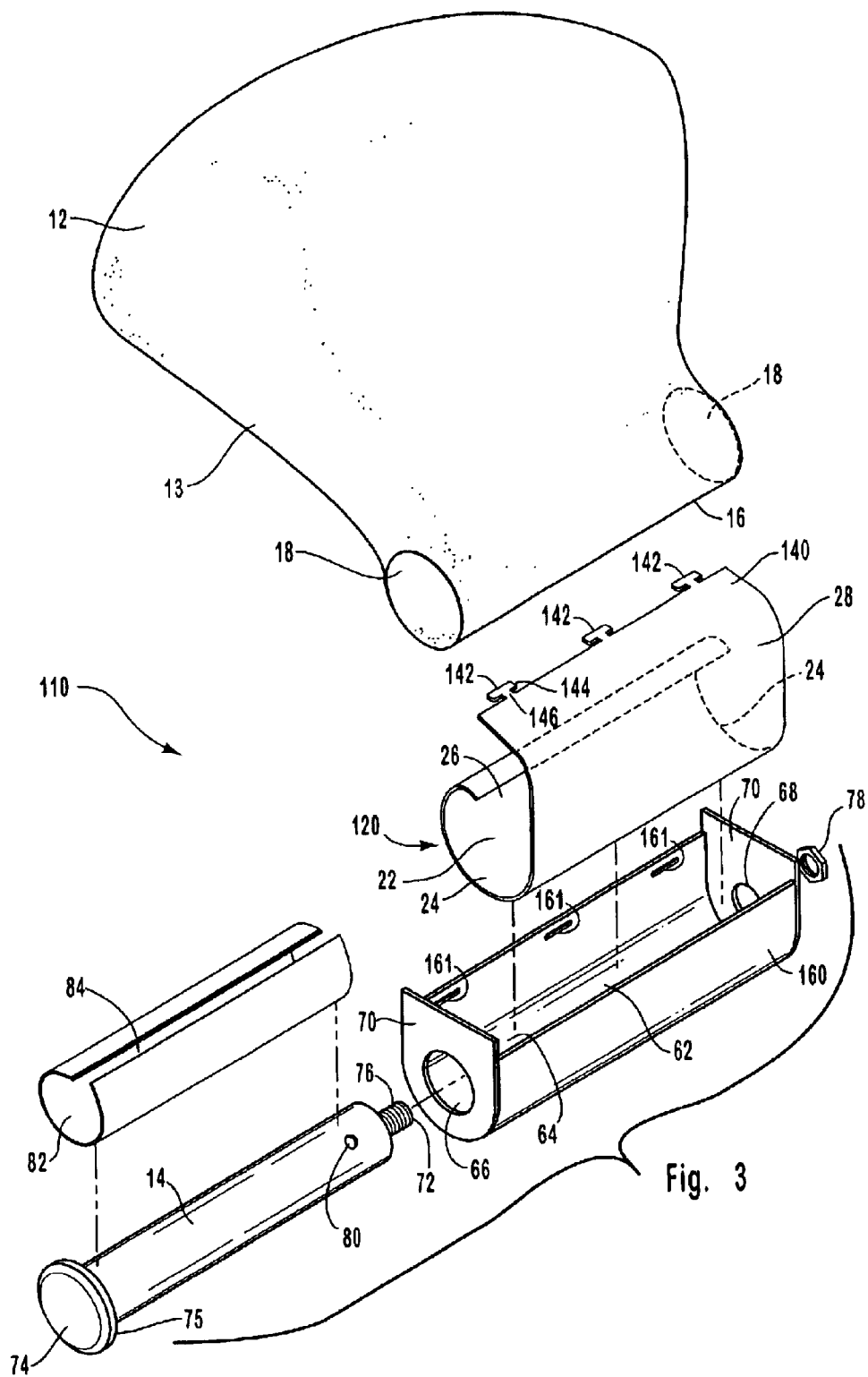
FIG. 3 is an exploded perspective view of a second embodiment of the inflatable restraint module.

FIG. 3 is an exploded perspective view of a second embodiment of the inflatable restraint module 110. Like the first embodiment, the second embodiment also includes a cushion 12, inflator 14, and heat shield 82. The cushion 12 may again have an expandable portion 13 that expands in response to the injection of gas into the cushion 12. A loop 16 of the cushion 12 defines orifices 18 into which the inflator 14 may be inserted.

The inflator 14 includes a first and a second end 72, 74. The second end 74 includes an expanded portion 75. The first end 72 of the inflator 14 may have inclined threads 76. Inflator gas may exit the inflator 14 through one or more gas exit ports 80. The heat shield 82 may be shaped to surround the inflator 14, and when the heat shield 82 is positioned around the inflator 14, the shield 82 may define a gap 84 that provides a convenient exit route for gas leaving the inflator 14.

The second embodiment of the inflatable restraint module 110 includes a chamber 120. Like the chamber 20 of the first embodiment, the chamber 120 of the second embodiment defines an interior compartment 22 having open ends 24. The inflator 14 may be inserted into the interior compartment 22 through one of the open ends 24. The chamber 120 may likewise define an opening 26 through which the loop 16 of the cushion 12 may be inserted. An outward extension 28 of the chamber 120 projects away from the opening 26.

Figure 4:
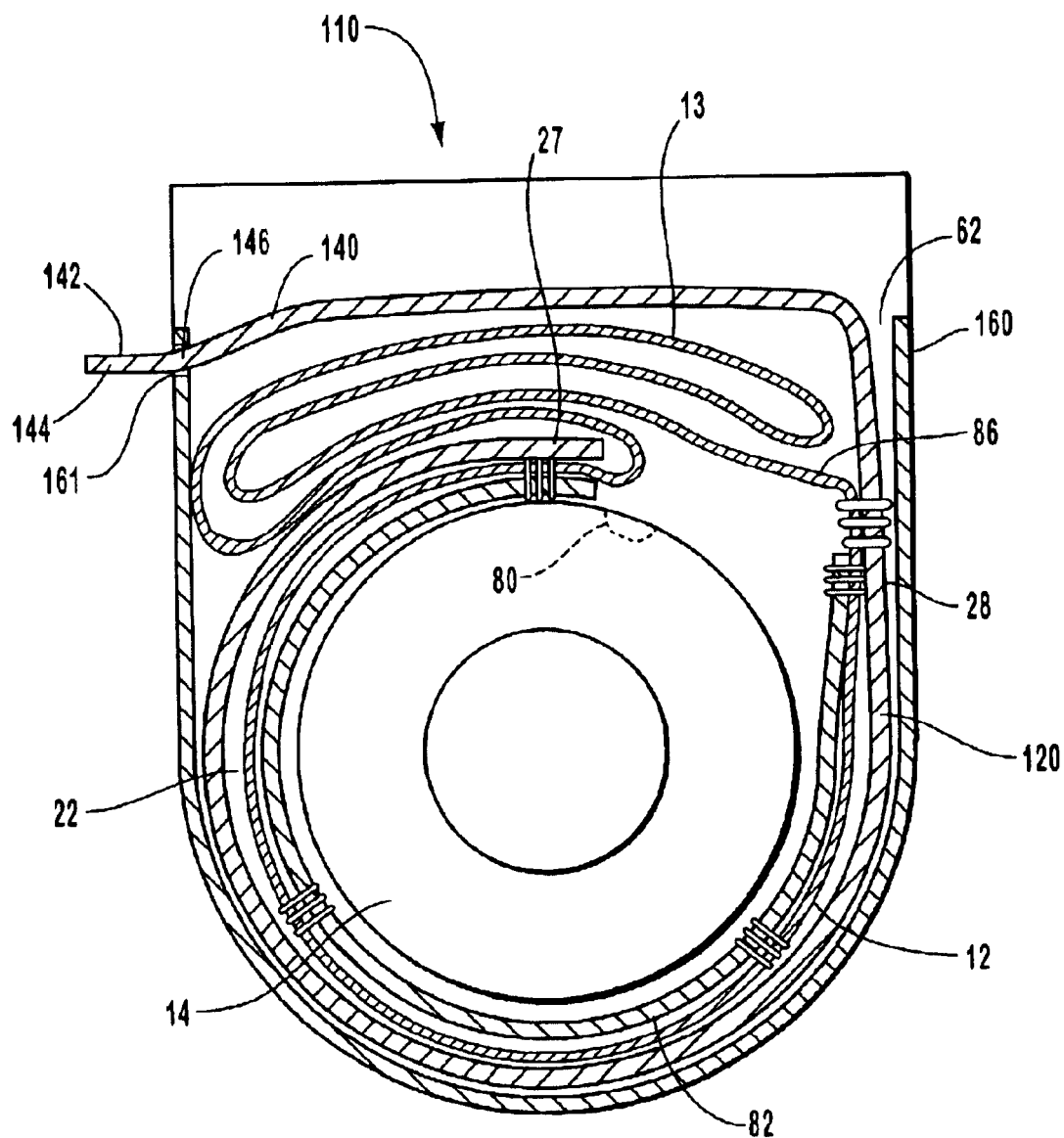
FIG. 4 is a cross-sectional view of the second embodiment of the inflatable restraint module.

The chamber 120 may also include a cover 140 shaped to cover the cushion 12. The cover 140 may be attached to or integrally formed with the outward extension 28. A set of tabs 142 on the cover 140 may be used to secure the cover 140 over the cushion 12, as illustrated in FIG. 4. The set of tabs 142 may include one or more tabs. Each tab 142 may include a head 144 and a narrow stem 146. The cover 140 may be made from various materials, such as fabric or plastic. The cover 140 will be explained in greater detail below.

The second embodiment of the inflatable restraint module 110 may also include a canister 160. Like the canister 60 of the first embodiment, the canister 160 of the second embodiment includes an open side 62 through which the cushion 12 and chamber 120 may be inserted into an interior region 64 of the canister 160. The canister 160 also includes a first and a second mouth 66, 68 positioned on opposing ends 70 of the canister 160 for receiving the inflator 14. As with the first embodiment 10, a threaded nut 78, which is wider than the second mouth 68, may be used to secure the inflator 14 within the canister 160.

The canister 160 may include a set of apertures 161 for receiving and securely retaining the set of tabs 142 of the cover 140. The apertures 161 may be spaced at the same distance apart as each of the tabs 142 of the cover 140. Each aperture 161 may be slightly smaller than each head 144 of a tab 142 so that the head 144 may deform slightly when being pushed through an aperture 161. The heads 144 may be resilient so that after deforming to fit through an aperture 161, the heads 144 return to their former shape to prevent inadvertent removal of the set of tabs 142 from the set of apertures 161.

Various techniques and mechanisms may be used to attach the cover 140 to the canister 160. For instance, rivets, a nut and bolt, or adhesives may be used to secure the cover 140 to the canister 160. If the cover 140 and extension 28 are not integrally formed, similar techniques and mechanisms may be used to attach the cover 140 to the outward extension 28. Also, a separate cover 140 may be sewn to the extension 28. Of course, material from which the cover 140 is made may be of limited strength or may include frangible seams (not shown) so that the cover 140 does not impede deployment of the inflatable cushion 12 through the cover 140.

FIG. 4 is a cross-sectional view of the assembled second embodiment of the inflatable restraint module 110 with a side view of the inflator 14. As with the first embodiment of the inflatable restraint module 10, a heat shield 82 is positioned around the inflator 14. The assembled heat shield 82 and inflator 14 are positioned within a loop 16 of the cushion 12. As illustrated in FIG. 4, the heat shield 82 may be sewn into, or otherwise secured within, the loop 16 of the cushion 12. The loop 16, heat shield 82, and inflator 14 are positioned within the interior compartment 22 of the chamber 120. The expandable portion 13 of the cushion 12 is folded and placed on a lip 27 of the chamber 120.

As illustrated, the outward extension 28 is coupled to the cushion 12. In this embodiment, the outward extension 28 is coupled to the cushion 12 by attachment to the cushion 12. More specifically, a portion 86 of the cushion 12 is attached to the extension 28 of the chamber 120 and is thus kept away from the opening 26 of the chamber 120 and the inflator 14 to prevent damage to the cushion 12 at the time of inflation.

The cover 140 is shaped to extend from the extension 28 across at least a portion of the open side 62 of the canister 160 to cover the cushion 12. The set of tabs 142 on the cover 140 interface or interlock with apertures 161 on the canister 160 to secure the cover 140 over the inflatable cushion 12. As illustrated in FIG. 4, a head 144 of a tab 142 has been pushed through the aperture 161, and the narrow stem 146 is positioned within the aperture 161. Alternatively, tabs (not shown) on the canister 160 may be positioned within apertures (not shown) in cover 140 to secure the cover 140 to the canister 160. Again, other techniques and mechanisms may be used to secure the cover 140 to the canister 160.

Figure 5:
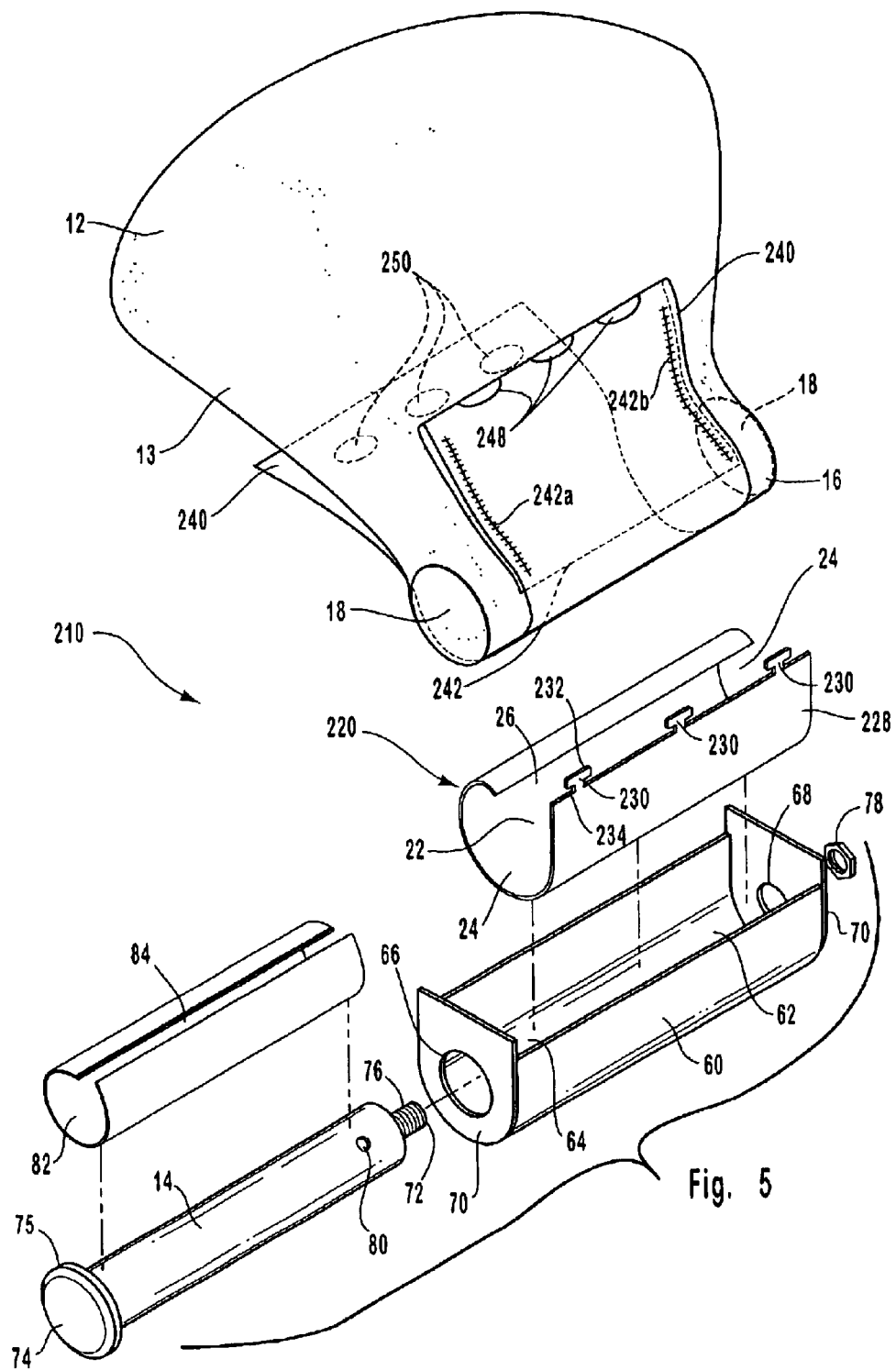
FIG. 5 is an exploded perspective view of a third embodiment of the inflatable restraint module.

FIG. 5 is an exploded perspective view of a third embodiment of the inflatable restraint module 210. Like the first embodiment, the third embodiment also includes a cushion 12, inflator 14, a canister 60, and heat shield 82. Again, the cushion 12 may have an expandable portion 13 that expands in response to the injection of gas into the cushion 12. A loop 16 of the cushion 12 defines orifices 18 into which the inflator 14 may be inserted.

The inflator 14 includes a first and a second end 72, 74. The second end 74 also includes an expanded portion 75. The first end 72 of the inflator 14 may include inclined threads 76. Inflator gas may exit the inflator 14 through a gas exit port 80.

The heat shield 82 may be shaped to surround the inflator 14 and when the heat shield 82 is positioned around the inflator 14, the heat shield 82 may define a gap 84 that provides a convenient exit route for gas leaving the inflator 14.

The third embodiment of the inflatable restraint module 210 may also include a canister 60. Like the canister 60 of the first embodiment, the canister 60 of the third embodiment includes an open side 62 through which the cushion 12 and chamber 220 may be inserted into an interior region 64 of the canister 60. The canister 60 also includes a first and a second mouth 66, 68 positioned on opposing ends 70 of the canister 60 for receiving the inflator 14. As with the first and second embodiments, a threaded nut 78, which is wider than the second mouth 68 on the canister 60, may be used to secure the inflator 14 within the canister 60.

The third embodiment of the inflatable restraint module 210 includes a chamber 220. Like the chambers 20, 120 of the first and second embodiments, the chamber 220 of the third embodiment defines an interior compartment 22 having open ends 24. The inflator 14 may be inserted into the interior compartment 22 through one of the open ends 24. The chamber 220 may likewise define an opening 26 through which the loop 16 of the cushion 12 may be inserted. An outward extension 228 of the chamber 220 projects away from the opening 26. The extension to 28 includes a set of tabs 230. Each tab 230 may include a head 232 and a narrow stem 234.

The third embodiment includes a cover 240 shaped to cover the cushion 12. However, the cover 240 of this embodiment is shaped differently than the cover 140 of the second embodiment. As illustrated in FIG. 5, the cover 240 has a rectangular shape. One end of the cover 240 is folded over on to itself to form a pocket 242. The pocket is sewn to the cushion 12 along a first and a second peripheral sewn line 244a–b to the inflatable cushion 12. Of course, other techniques and mechanisms for attaching the cover 240 to the inflatable cushion 12 come within the scope of this invention. For instance, adhesives, rivets, or a nut and bolt may be used to attach the cover 240 to the inflatable cushion 12. Also, the cover 240 could be integrally formed with the cushion 12. The cover 240 may be made from various materials, including fabrics and plastics, as will be understood by those skilled in the art.

The cover 240 includes a first and a second set of apertures 248, 250. The first and a second set of apertures 248, 250 are shaped to receive the set of tabs 230 on the outward extension 228. The set of tabs 230 includes one or more tabs 230 on the extension 228 for selectively interlocking with the first and second set of apertures 248, 250. The first set of tabs 230 are positioned at a top of the pocket 242. The technique by which the cover 240 may surround the inflatable cushion 12 will be illustrated and discussed in further detail in connection with FIG. 6.

Figure 6:
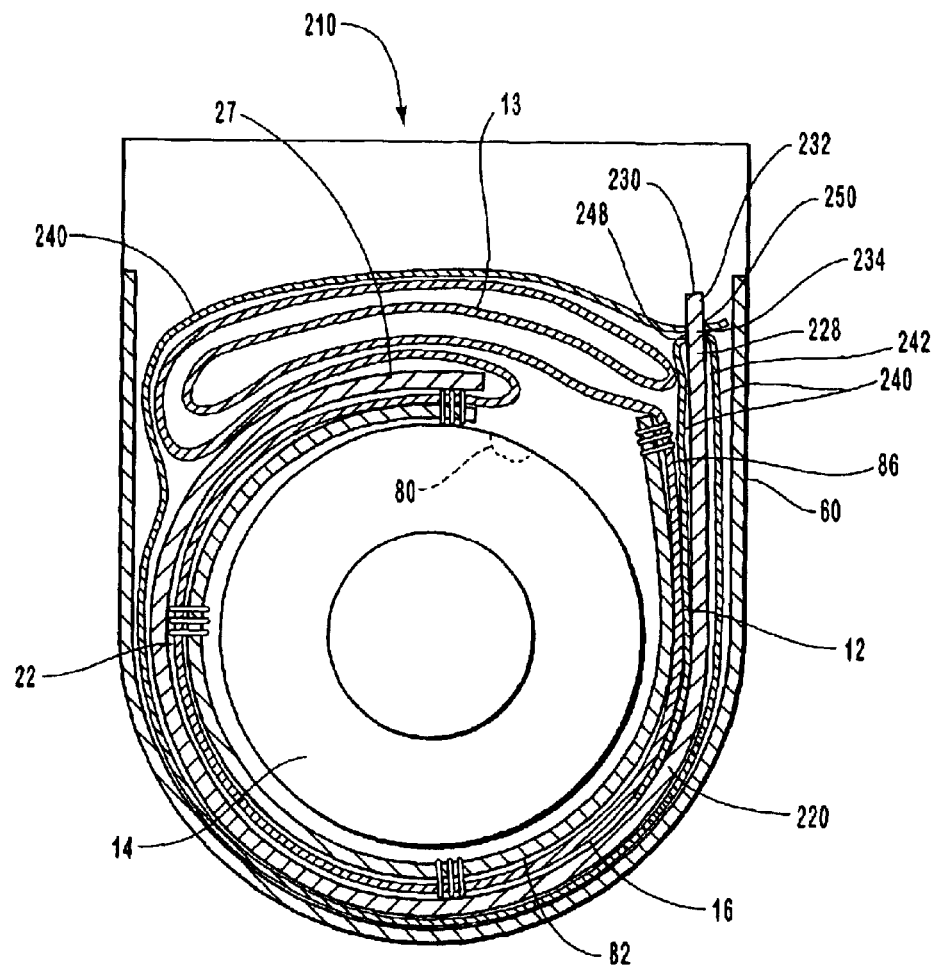
FIG. 6 is a cross-sectional view of the third embodiment of the inflatable restraint module.

FIG. 6 is a cross-sectional view of the third embodiment of the inflatable restraint module 210. As with the first and second embodiments, the inflator 14 is positioned within a heat shield 82, both of which are positioned within the loop 16 of the cushion 12 and the interior compartment 22 defined by the chamber 220. As illustrated in FIG. 6, the heat shield 82 may be sewn into, or otherwise secured within, the loop 16 of the cushion 12. The expandable portion 13 of the cushion 12 is folded and placed on a lip 27 of the chamber 220.

The outward extension 228 of the chamber 220 is coupled to the cushion 12. In this embodiment, the outward extension 228 is coupled to the cushion 12 by attachment to the cover 240, which is attached to the extension 228. More specifically, a portion 86 of the cushion 12 is attached to the cover 240 and the cover 240 is attached to the extension 228 to keep the portion 86 of the cushion 12 away from the opening 26. As a consequence, the portion 86 is kept away from heat generated by the inflator 14 during inflation of the cushion 12.

As shown in FIG. 6, the extension 228 is positioned within the pocket 242 of the cover 240. The cushion 12 and cover 240 are attached to the extension 228 by placing the first set of apertures 248 in the cover 240 on the tabs 230 of the extension 228. Again, the heads 232 of the tabs 230 are wider than the apertures 248 in the cover 240 to securely retain the apertures 230 on the narrow stem 234 of the tabs 230. The cover 240 is wrapped around the cushion 12 and chamber 220. The second set of apertures 250 is then positioned on the set of tabs 230 to secure the cover 240 around the cushion 12 and chamber 220. Thus, the cover 240 is attached to the extension 228 using the sets of apertures 248, 250 in the cover 240 and the mating set of tabs 230 on the extension 228. In an alternative embodiment, the second set of apertures 250 could be positioned on tabs (not shown) on the canister 60 to secure the cover 240 over the cushion 12. Other techniques may be used to attach the cover 240 to the extension 228. For instance, the cover 240 may be sewn to the extension 228. Alternatively, rivets, a nut and bolt, or the like may be used to secure the cover 240 to the extension 228.

The assembled cover 240, chamber 220, cushion 12, heat shield 82, and inflator 14 may be positioned, or at least partially positioned, within the canister 60. The canister 60 protects the cover 240, chamber 220, cushion 12, heat shield 82, and inflator 14 from damage and enables the module 210 to be attached to a vehicle.

In view of the foregoing, the inflatable restraint module provides substantial advantages over conventional airbag modules. The individual components of the inflatable restraint module are simple in design and, as a consequence, are less expensive to manufacture than conventional module components. Many of the components may be made from plastic or fabric rather than metal, further diminishing the cost and weight of the module.

The present invention may be embodied in other specific forms without departing from its scope or essential characteristics. The described embodiments are to be considered in all respects only illustrative, not restrictive. The scope of the invention is, therefore, indicated by the appended claims rather than by the foregoing description. All changes that come within the meaning and range of equivalency of the claims are to be embraced within their scope.

What is claimed is:

1. An inflatable restraint module, comprising:
   a one-piece chamber shaped to receive an inflator and to at least partially enclose an inflatable cushion;
   an opening in the chamber;
   an outward extension of the chamber that projects away from the opening and is coupled to the inflatable cushion;
   a curved lip of the chamber extending toward the opening to support at least a portion of the inflatable cushion;
   a canister having an open side sized to receive the inflatable cushion and chamber; and
   a mouth at one end of the canister dimensioned to receive the inflator.

2. The inflatable restraint module as defined in claim 1, wherein a portion of the cushion is attached to the extension to keep the portion of the cushion away from the opening of the chamber.

3. The inflatable restraint module as defined in claim 1, further comprising a cover shaped to cover the cushion.

4. The inflatable restraint module as defined in claim 3, wherein a portion of the cushion is attached to the cover and the cover is attached to the extension to keep the portion of the cushion away from the opening.

5. The inflatable restraint module as defined in claim 3, wherein the cover is attached to the extension and canister.

6. The inflatable restraint module as defined in claim 3, wherein the cover is integrally formed with the extension.

7. The inflatable restraint module as defined in claim 1, wherein the chamber and extension are integrally formed.

8. The inflatable restraint module as defined in claim 1, wherein the chamber is made from plastic.

9. The inflatable restraint module as defined in claim 1, wherein the opening in the chamber extends across a length of the chamber.

10. The inflatable restraint module as defined in claim 1, wherein the inflatable cushion is shaped to receive the inflator.

11. The inflatable restraint module as defined in claim 10, further comprising a heat shield shaped to receive the inflator for protecting the inflatable cushion from heat generated by the inflator when an inflator positioned within the cushion is activated.

12. An inflatable restraint module, comprising:
    a one-piece chamber shaped to receive an inflator and to at least partially enclose an inflatable cushion;
    an opening in the chamber;
    an outward extension of the chamber that projects away from the opening and is coupled to the inflatable cushion;
    a curved lip of the chamber extending toward the opening to support at least a portion of the inflatable cushion;
    a cover shaped to cover the cushion;
    a canister having an open side sized to receive the inflatable cushion and chamber; and
    a mouth at one end of the canister dimensioned to receive the inflator.

13. The inflatable restraint module as defined in claim 12, wherein a portion of the inflatable cushion is attached to the extension to keep the portion of the cushion away from the opening of the chamber.

14. The inflatable restraint module as defined in claim 12, wherein the chamber and extension are integrally formed.

15. The inflatable restraint module as defined in claim 12, wherein the chamber is made from plastic.

16. The inflatable restraint module as defined in claim 12, wherein the opening in the chamber extends across a length of the chamber.

17. The inflatable restraint module as defined in claim 12, wherein the cover is made from fabric.

18. The inflatable restraint module as defined in claim 12, wherein the cover is shaped to surround the inflatable cushion.

19. The inflatable restraint module as defined in claim 12, wherein the cover is shaped to extend from the extension across at least a portion of the open side of the canister to cover the cushion.

20. An inflatable restraint module, comprising:
    an inflatable cushion shaped to receive an inflator;
    a one-piece chamber shaped to receive the inflator and to at least partially enclose the inflatable cushion;
    an opening in the chamber;
    an outward extension of the chamber that projects away from the opening and is coupled to the inflatable cushion;
    a curved lip of the chamber extending toward the opening to support at least a portion of the inflatable cushion;
    a cover shaped to be positioned around the cushion and chamber;
    a canister having an open side sized to receive the cover, cushion, and chamber when the cover is positioned around the cushion and chamber; and
    a mouth at one end of the canister dimensioned to receive the inflator.

21. The inflatable restraint module as defined in claim 20, further comprising:
    a set of tabs on the extension; and
    a first and a second set of apertures in the cover, the first and second set of apertures each being positioned in the cover to receive the set of tabs and secure the cover around the cushion and chamber.

22. The inflatable restraint module as defined in claim 20, wherein the cover is made from fabric.

23. The inflatable restraint module as defined in claim 20, further comprising a heat shield shaped to receive the inflator for protecting the inflatable cushion from heat generated by the inflator when an inflator positioned within the cushion is activated.

24. The inflatable restraint module as defined in claim 23, wherein the heat shield is made from fabric.

* * * * *